(12) United States Patent
Forsén

(10) Patent No.: US 6,341,575 B1
(45) Date of Patent: Jan. 29, 2002

(54) DEVICE FOR GRIPPING AN ANIMAL RELATED MEANS

(75) Inventor: Gösta Forsén, Tullinge (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/581,832
(22) PCT Filed: Dec. 16, 1998
(86) PCT No.: PCT/SE98/02338
  § 371 Date: Jun. 19, 2000
  § 102(e) Date: Jun. 19, 2000
(87) PCT Pub. No.: WO99/33020
  PCT Pub. Date: Jul. 1, 1999

(30) Foreign Application Priority Data

Dec. 19, 1997 (SE) ............................................. 9704779

(51) Int. Cl.$^7$ .................................................. A01J 5/02
(52) U.S. Cl. .................................................. 119/14.08
(58) Field of Search .................... 119/14.01, 14.02, 119/14.03, 14.08, 14.1, 14.18

(56) References Cited

U.S. PATENT DOCUMENTS

| | | | |
|---|---|---|---|
| 4,805,557 A | * | 2/1989 | Van Der Lely et al. .. 119/14.08 |
| 4,867,103 A | | 9/1989 | Montalescot et al. |
| 4,941,106 A | | 7/1990 | Krieger |
| 5,219,264 A | | 6/1993 | McClure et al. |
| 5,934,220 A | * | 8/1999 | Hall et al. ................ 119/14.08 |
| 5,979,359 A | * | 11/1999 | Hansson .................. 119/14.08 |
| 6,227,142 B1 | * | 5/2001 | Birk ........................ 119/14.08 |
| 6,234,109 B1 | * | 5/2001 | Andersson et al. ...... 119/14.08 |

* cited by examiner

Primary Examiner—Thomas Price
(74) Attorney, Agent, or Firm—Young & Thompson

(57) ABSTRACT

A device for gripping an animal related element comprises a base portion adapted to be connected to a robot arm, and an image capturing element provided with a housing and a lens having a viewing axis, the image capturing element being arraged on the base portion. According to the invention, alteration elements are provided for allowing the viewing axis to be altered, wherein the alteration elements comprise hinge elements and a driving element for allowing the image capturing element to be pivoted about the hinge element.

8 Claims, 6 Drawing Sheets

DEVICE FOR GRIPPING AN ANIMAL RELATED MEANS

TECHNICAL FIELD OF THE INVENTION

The present invention relates to a device for gripping an animal related means, comprising a base portion adapted to be connected to a robot arm, and an image capturing means provided with a housing and a lens having a viewing axis, said image capturing means being arranged on said base portion.

It also relates to an apparatus for performing an animal related operation, comprising a robot arm, and a device for gripping an animal related means, said device being connectible to said robot arm, and furthermore an image capturing device.

BACKGROUND OF THE INVENTION

Such a device and such an apparatus are known from WO 97/15900, according to which the image capturing device is arranged on the robot arm or on the device. The viewing axis of the lens of the image capturing device is the same as the longitudinal extension of the robot arm.

The therein described apparatus and device suffers from a drawback in that when attaching a teatcup onto a rear teat, a front teat may partly or completely obstruct viewing of the rear teat, resulting in that the attachment of the teatcup may fail.

OBJECT OF THE INVENTION

It is thus the object of the invention to obtain an improved apparatus and an improved device, which are better adapted to perform animal related operations.

SUMMARY OF THE INVENTION

The object has been achieved by a device of the initially defined kind, which is characterised in that alteration means are provided for allowing said viewing axis to be altered, wherein said alteration means comprises a hinge means and a driving means for allowing said image capturing means to be pivoted about said hinge means.

It has also been achieved by an apparatus of the initially defined kind, which is characterised in that said image capturing device is adapted to be pivoted in relation to said robot arm.

By the device and the apparatus according to the invention, it is possible to move the robot arm to a position where a front teat does not obstruct the view while e.g. attaching a teatcup onto a rear teat. This is particularly important regarding cows having teats with a narrow intermediate space (less than 10 cm). Furthermore, it is possible to move away from a lower part of the udder beside the teat, or from the belly, in cases when the lower part of the udder or the belly obstructs the movement of the robot arm, in particularly in cases where a housing of a teat locating device, such as an image capturing device, is mounted on top of the robot arm.

Preferably, the housing of said image capturing means is rigidly arranged on said base portion. Hereby, a fixed relation between the base portion and the image capturing device is achieved.

Suitably, said base portion comprises a gripper portion and a connector portion.

Preferably, the housing of said image capturing means is arranged on said connector portion. Alternatively, the housing of said image capturing means is arranged on said gripper portion.

Suitably, said gripper portion is connected to said connector portion via said hinge means. Hereby, said gripper portion is pivotably arranged in relation to said connector portion.

Preferably, said base portion is provided with said hinge means at a connection point adapted to be connected to said robot arm.

DRAWING SUMMARY

The invention will now be described in more detail with reference to the accompanying drawings, in which FIGS. 1A and 1B are perspective views of a device according to the present invention.

DETAILED DESCRIPTION

Figure 1A:
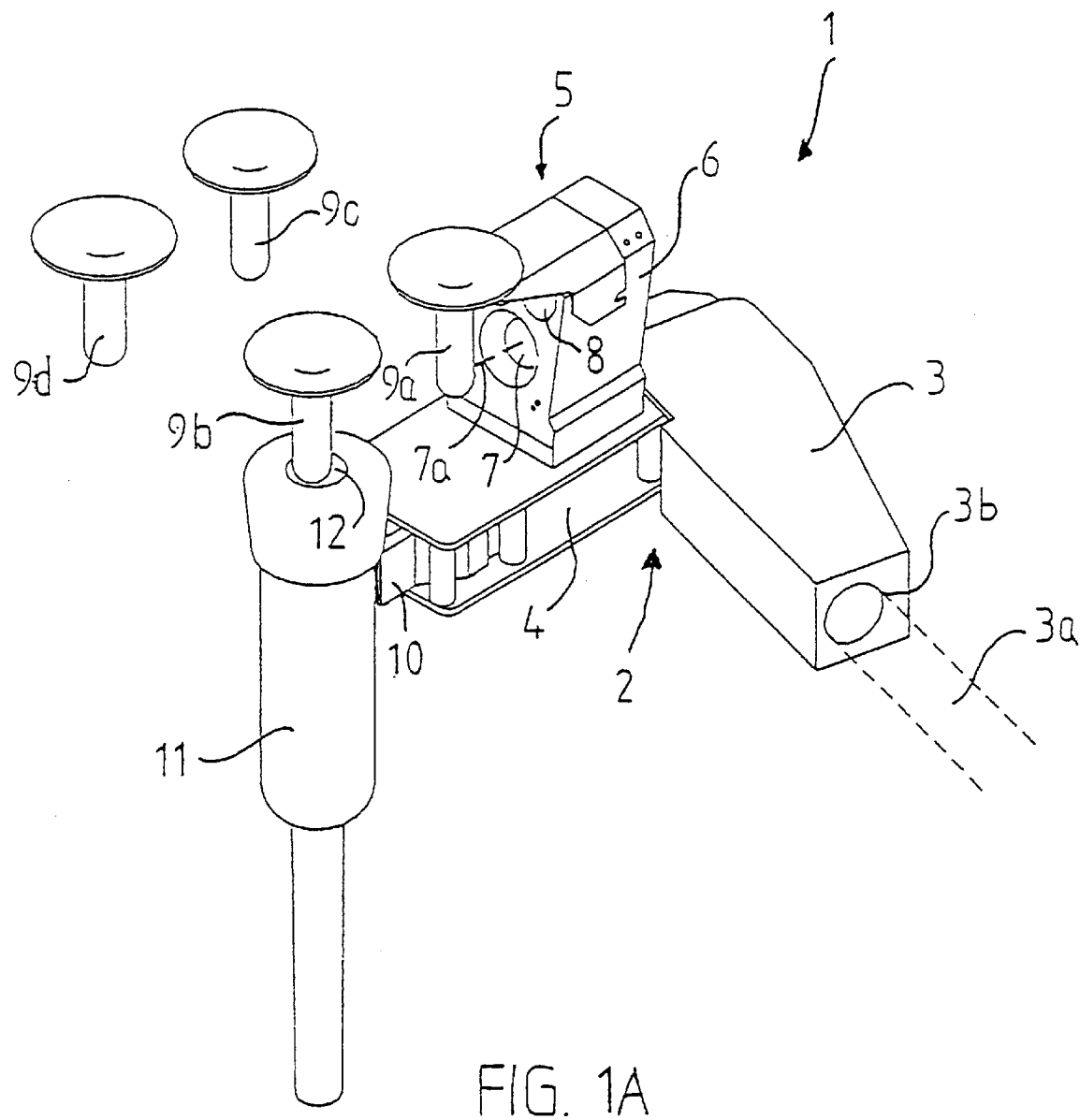
FIGS. 1C–1E illustrate three different relative positions of the gripper portion in relation to the connector portion.

FIG. 1A is a perspective view of a device 1 according to the present invention. The device 1 comprises a base portion 2, divided into a connector portion 3 and a gripper portion 4. The connector portion 3 is adapted to be connected to a robot arm 3a at 3b. On top of the gripper portion 4, there is provided an image capturing device 5, comprising a housing 6 with an opening for a lens 7—having a viewing axis 7a—of a camera inside the housing 6. The shown image capturing device 5 is provided with an optional illumination means 8, which may be a laser transmitter for transmitting at least one laser plane to form at least one line onto a teat 9a, 9b, 9c, 9d of an animal. Alternatively, the optional illumination means 8 may be a halogen lamp for creating better light conditions for the camera while capturing an image of the teat or teats 9a, 9b, 9c, 9d. However, as modern cameras are very light sensitive, the illumination means is not necessary for performance of the present invention.

The gripper portion 4 is provided with a gripping device 10 adapted to grip a receiving member (not shown) of an animal related means 11, in FIG. 1A shown as a teatcup connectible to a source of vacuum (not shown), but may alternatively be a teat cleaner, a teat after-treatment means or the like.

Figure 1B:
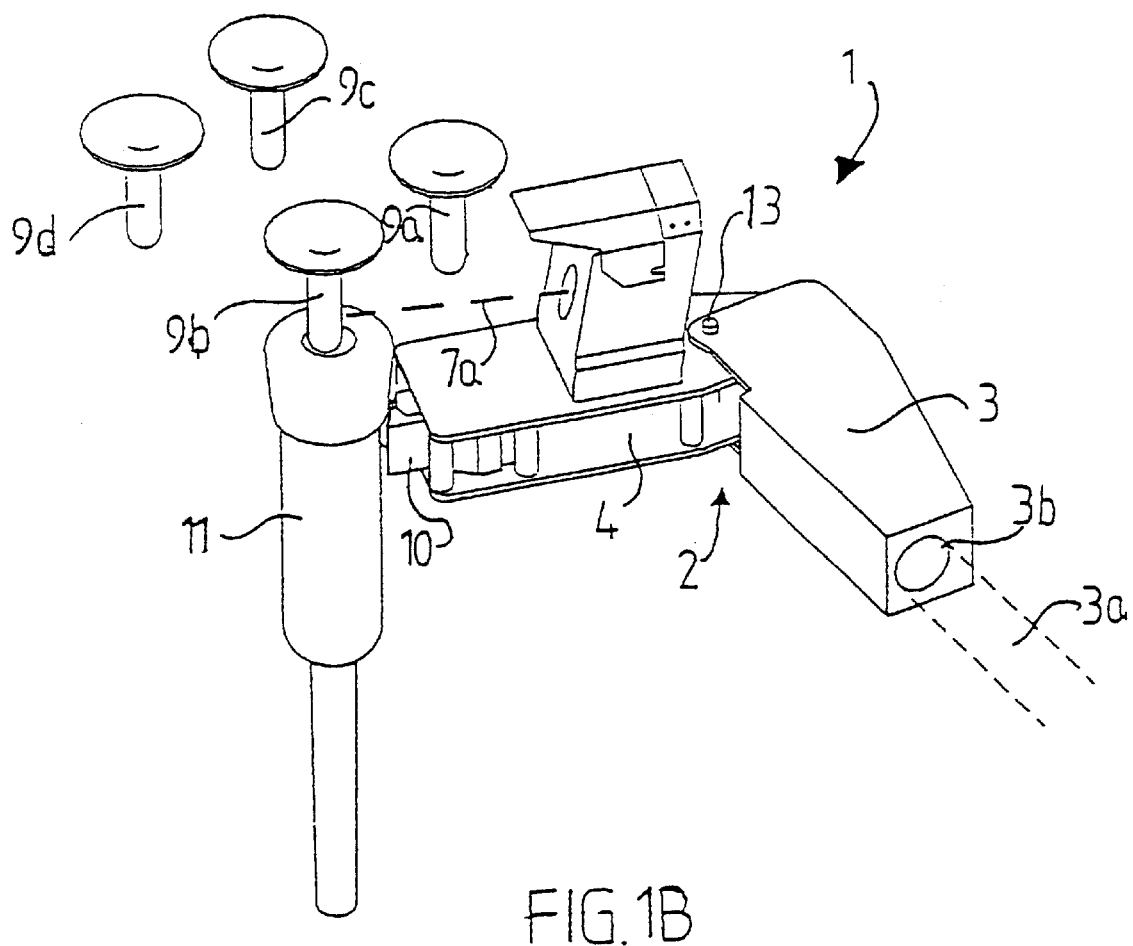

During automatic attachment of a teatcup 11 onto a teat, the device 1 is connected to the robot arm 3a. In FIG. 1a, the teatcup 11 is intended to be attached to the teat 9b. However, the viewing of the teat 9b is obstructed by the teat 9a. This situation is illustrated by the viewing axis 7a not being able to pass the teat 9a. Since the image capturing device cannot view the teat 9b, and since the viewing axis 7a of the image capturing device 5 is above the teat introduction opening 12 of the teatcup 11, (see also FIG. 1B), attachment of the teatcup onto the teat 9b may fail.

In order to view the teat 9b, the base portion 2 must be moved away from the teat 9a. However, if the base portion 2 is moved in the direction of the longitudinal extension of the robot arm 3a, the viewing axis will not be directed towards the teat 9b, but beside it. Accordingly, also the teat introduction 12 opening will not be underneath the teat 9b, but beside it.

Figure 1C:
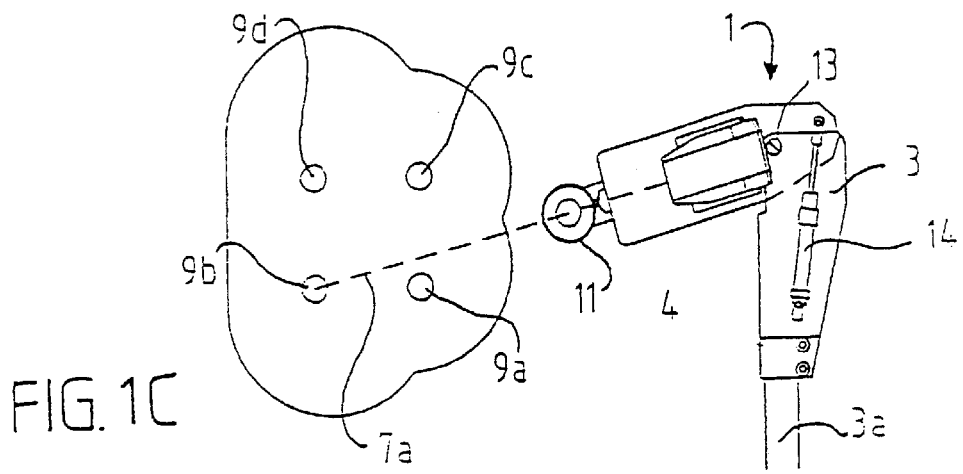
Figure 1D:
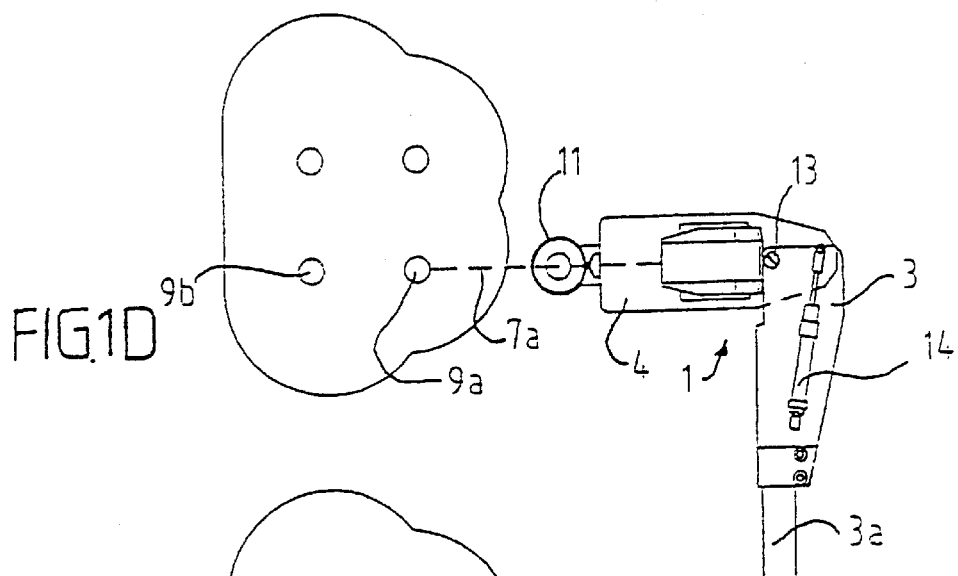
Figure 1E:
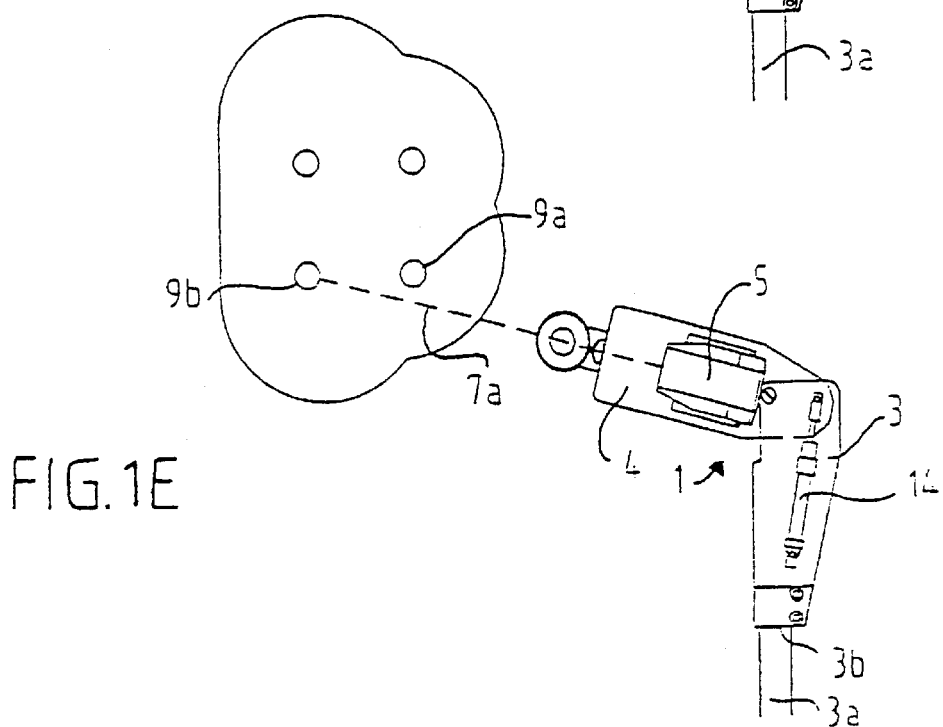

In order to allow alteration of the viewing axis 7a so that it is possible to view the teat 9b in the centre of the image, the gripper portion 4 is allowed to be moved in relation to the connector portion 3 in a horizontal plane about a hinge 13 by means of a driving means 14, such as a pneumatic or hydraulic cylinder motors, see FIGS. 1C–1E, or an electric step motor. As can be understood from FIG. 1B, the viewing axis 7a crosses a coaxial axis (not indicated) of the teatcup, i.e. above a teat introduction opening 12 of the teatcup 11. When the teat 9b is in the centre of the captured image, the teat cup opening 12 is consequently underneath the teat introduction opening of the teatcup 11. The teatcup 11 is then moved upwards by the robot arm 3a and attached to the teat 9b while the interior of the teatcup 11 is subjected to a vacuum.

It follows, that in order to direct the viewing axis 7a towards the teat 9b, it is necessary to move the robot arm too, preferably in the direction of the longitudinal extension of the robot arm 3a. In FIG. 1C, the robot arm has been moved to a position where the teat 9b can be viewed from an altered position.

FIGS. 1C to 1E illustrate three different relative positions of the gripper portion 4 in relation to the connector portion 3. As can be seen in FIG. 1D, it is not possible to view the teat 9b, as the teat 9a obstructs the view.

In FIG. 1C, the robot arm 3a has moved the device 1 beyond the teat 9a. The gripper portion 4 has been pivoted in relation to the connector portion 3, so that the viewing axis 7a falls between the teats 9a and 9c. It is now possible to view the teat 9b and to move the teatcup 11 to a position underneath the teat 9b, from which it is possible to securely attach the teatcup 11 onto the teat 9b.

In FIG. 1E, the robot arm 3a has moved the device 1 to the robot arm side of the teat 9a. The gripper portion 4 has been pivoted in relation to the connector portion 3, so that the viewing axis 7a falls in front of the teat 9a. It is now possible to view the teat 9b and to move the teatcup 11 to a position underneath the teat 9b, as shown in FIG. 1c, and to securely attach the teatcup 11 onto the teat 9b.

It should be noted that the teat 9b would in theory be possible to be viewed from the opposite direction, i.e. from the left in the FIGS. 1C to 1E. However, in practise this would be complicated, as the right rear leg of the animal would obstruct the movement of the robot arm 3a and the viewing; in FIGS. 1C to 1E, the base portion 2 is situated underneath the belly of the animal.

Figure 2A:
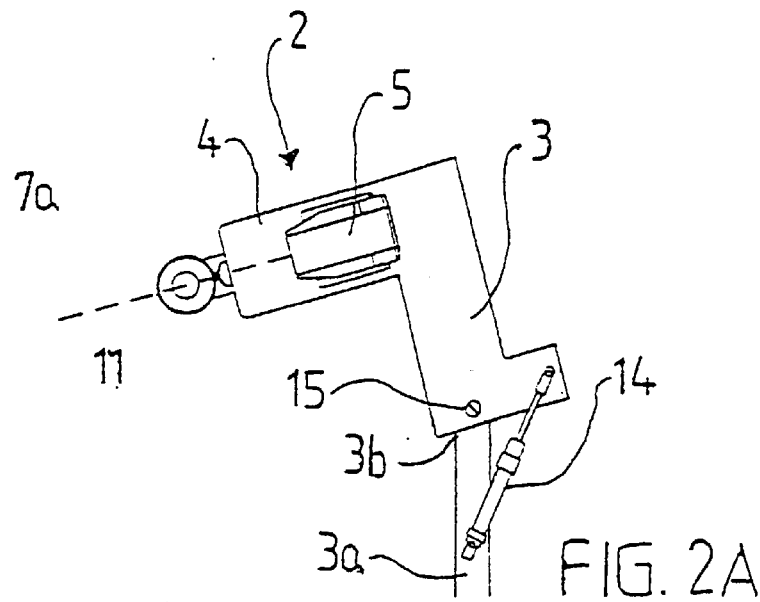
FIGS. 2A–2C illustrate examples of possible positions of the base portion in relation to the robot arm in accordance with the second embodiment.

FIG. 2A illustrates a second embodiment of the invention, in which the base portion 2 comprises a connector portion 3, which is rigidly connected to the gripper portion 4. In order to achieve the alteration of the viewing axis, the connector portion 3 is connected to the robot arm 3a via a joint 15. Movement in a horizontal plane about the joint 15 is performed by means of driving means 14 of the kind described above.

Figure 2B:
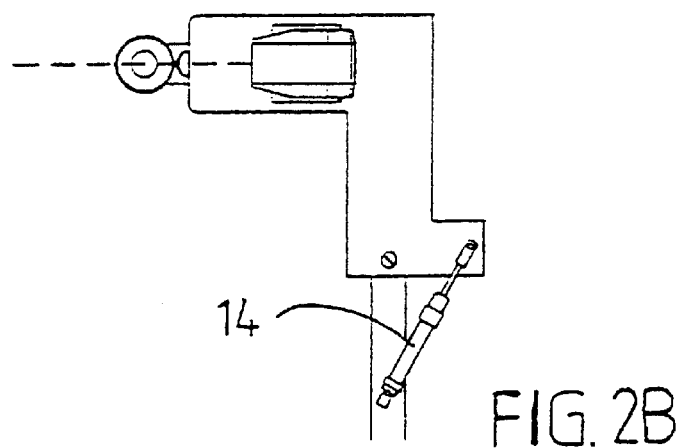
Figure 2C:
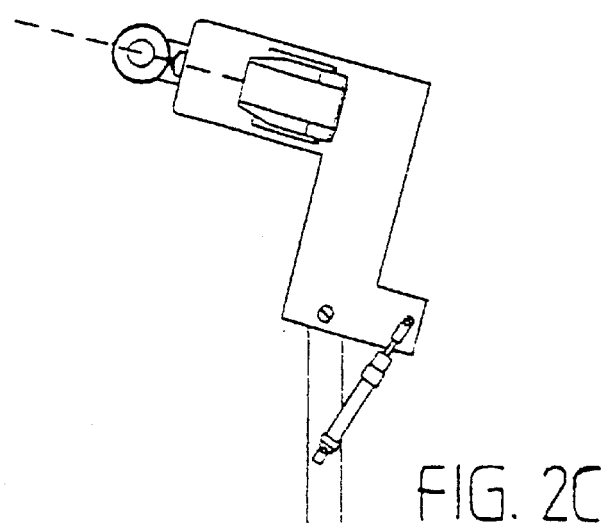

FIGS. 2A to 2C illustrate examples of possible positions of the base portion 2 in relation to the robot arm 3a, in accordance with the second embodiment. The obtained result is the same as in the embodiment of FIGS. 1A–1E.

Figure 3A:
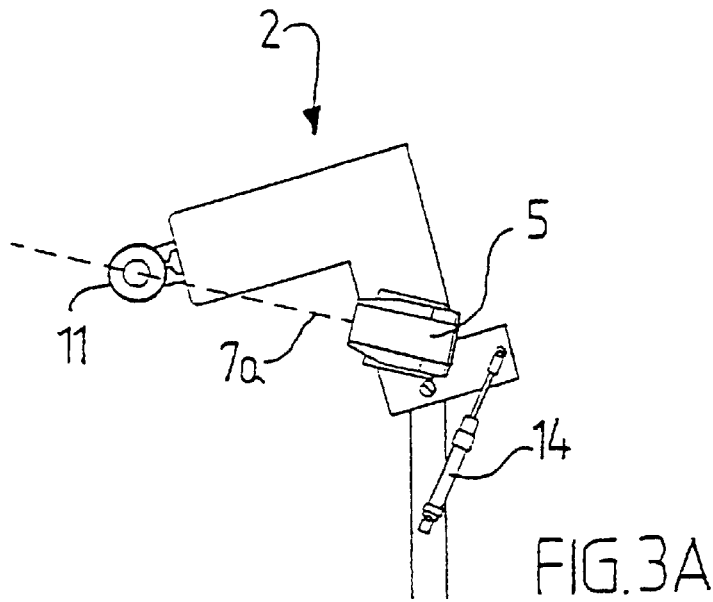
FIGS. 3A–3C illustrate a third embodiment of the invention according to which the image capturing device is arranged on the connector portion of the base portion.
Figure 3B:
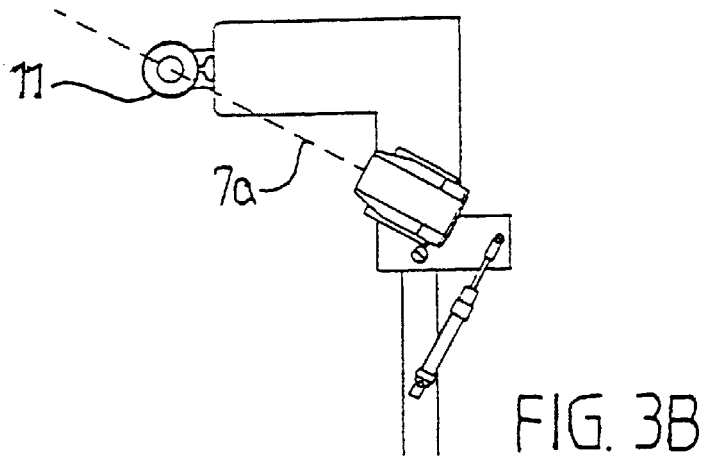
Figure 3C:
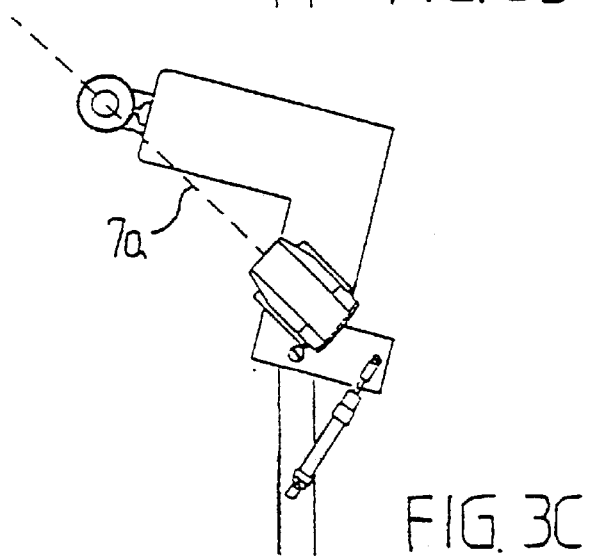

FIGS. 3A–3C illustrate a third embodiment of the invention, according to which the image capturing device 5 is arranged on the connector portion 4 of the base portion 2. It should be understood that also this embodiment obtains the same result.

Figure 4A:
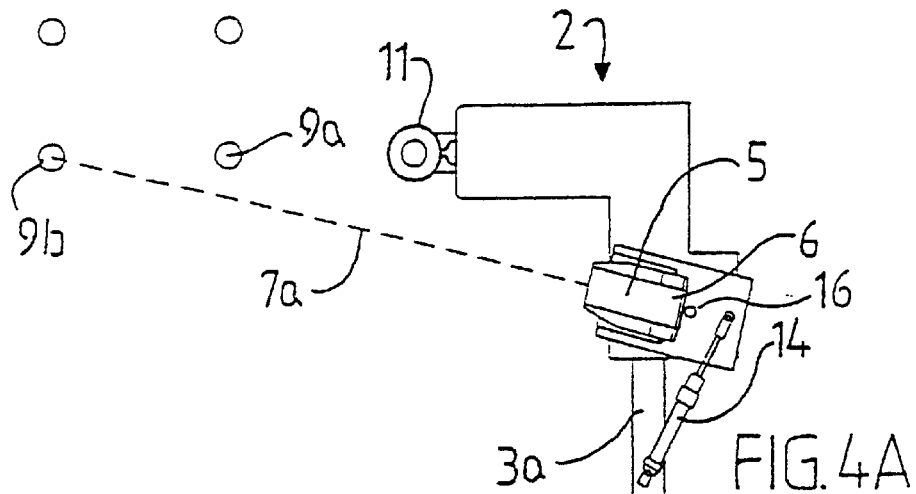
FIGS. 4A–4C illustrate a fourth embodiment of the invention in which the base portion is rigidly connected to the robot arm.
Figure 4B:
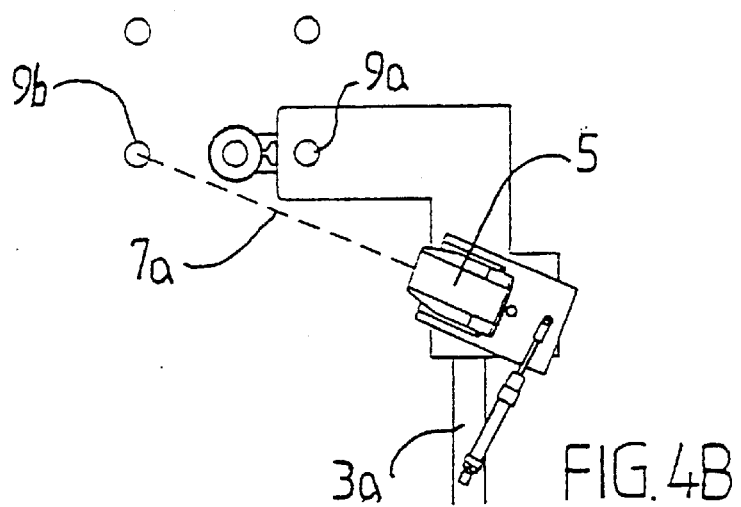

FIG. 4A illustrates a fourth embodiment of the invention, in which the base portion 2 is rigidly connected to the robot arm 3a. In order to achieve the effect described above, the housing 6 of the image capturing device 5 is pivotally arranged about a vertical axis 16 in relation to the base portion 2. Pivoting is performed by means of a driving means 14, in the form of a pneumatic cylinder. Alternatively, a pneumatic vane motor or an electric motor may be utilised.

Figure 4C:
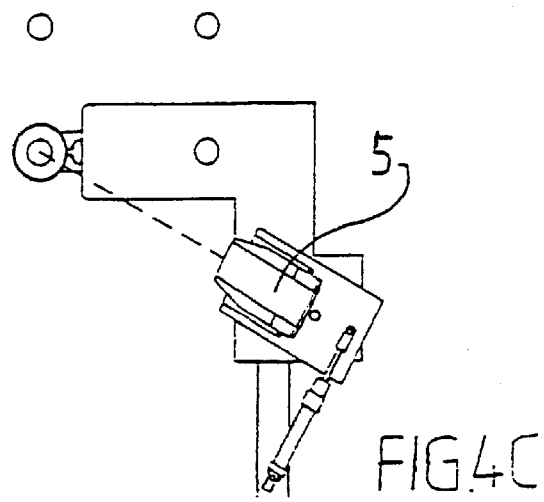

While moving the robot arm with gripped teatcup 11, the viewing axis 7a is kept aimed at the teat 9b. When moving closer, the housing is pivoted clockwise by means of the driving means 14. The teatcup 11 is moved towards the teat 9b until the viewing axis 7a coincides with the coaxial axis of the teatcup 11, i.e. until the teat 9b is above a teat introduction opening 12 of the teatcup 11 (see FIG. 4C). The teatcup 11 is moved upwards towards the teat 9b and is attached thereto.

Of course, the pivotal housing according to fourth embodiment is possible to be employed in anyone of the previously described embodiments.

For automatic performance of the animal related operation, i.e. teatcup attachment, teat cleaning or the like, the apparatus is provided with a control means, which is able to perform analysis of a captured image. The robot arm 3a, the driving means 14, the gripping means 10, etc. are thus movable in response to the image capturing device 5.

It should be understood that the pivotal movement about the hinge 13, 15, 16 is performed stepwise or continuously by means of the driving means 14. In its simplest form, the pivotal movement is performed solely between two extreme positions.

The above described device and apparatus are suitable for performing animal related operations, such as teat cleaning and teatcup attachment on milk animals, such as cows, sheep, goats, horses and buffaloes.

What is claimed is:

1. A device for gripping at least one animal related means for application on a first and a at least a second animal part, comprising a base portion connected to a robot arm (3a), and an image capturing means (5) provided with a housing (6) and a lens (7) having a viewing axis (7a), said image capturing means (5) being arranged on said base portion (2), characterized in that alteration means (13, 14, 15, 16) are provided for allowing said viewing axis (7a) to be altered between a first and at least a second direction, said first direction being suitable for viewing of said first animal part and for application of said animal related means on said first animal part, viewing of said second animal part being obstructed by said first animal part in said first direction, and said second direction being suitable for viewing of said second animal part and for application of said animal related means on said second animal part, wherein said alteration means comprises a hinge means (13, 15, 16) and a driving means (14) for allowing said image capturing means to be pivoted about said hinge means.

2. A device according to claim 1, wherein the housing (6) of said image capturing means (5) is rigidly arranged on said base portion (2).

3. A device according to claim 2, wherein said base portion (2) is provided with said hinge means (15) at a connection point (3b) adapted to be connected to said robot arm (3a).

4. A device according to claim 1, wherein said base portion (2) comprises a gripper portion (4) and a connector portion (3).

5. A device according to claim 4, wherein the housing (6) of said image capturing means (5) is arranged on said connector portion (3).

6. A device according to claim 4, wherein the housing (6) of said image capturing means is arranged on said gripper portion (4).

7. A device according to claim 4, wherein said gripper portion (4) is connected to said connector portion (3) via said hinge means (13).

8. Milking robot comprising device according to claim 1.

* * * * *